No. 764,376. PATENTED JULY 5, 1904.
M. A. RICHTER.
PHOTOGRAPHIC SHUTTER.
APPLICATION FILED JULY 21, 1903.
MODEL. 2 SHEETS—SHEET 1.

Witnesses:
Thomas Durant
Durant Church

Inventor:
Max A. Richter
by Church & [illegible]
his Attys

No. 764,376. PATENTED JULY 5, 1904.
M. A. RICHTER.
PHOTOGRAPHIC SHUTTER.
APPLICATION FILED JULY 21, 1903.

MODEL. 2 SHEETS—SHEET 2.

Witnesses:
Thomas Durant
Durant Church

Inventor:
Max A. Richter,
By Church & Church
his Attys

No. 764,376.

Patented July 5, 1904.

UNITED STATES PATENT OFFICE.

MAX ADALBERT RICHTER, OF DRESDEN, GERMANY.

PHOTOGRAPHIC SHUTTER.

SPECIFICATION forming part of Letters Patent No. 764,376, dated July 5, 1904.

Application filed July 21, 1903. Serial No. 166,474. (Model.)

*To all whom it may concern:*

Be it known that I, MAX ADALBERT RICHTER, a subject of the King of Saxony, residing at 71 Wittenbergerstrasse, Dresden, Saxony, Germany, have invented certain new and useful Improvements in or Relating to Photographic Shutters, of which the following is a specification.

The shutter forming the subject of this invention is provided with two pivoted blades arranged to move in opposite directions about the same pivot and differs from other shutters by the way in which the setting, opening, and closing are effected. These blades are mounted upon the end of a pivoted lever and are provided with projections which in setting engage over lugs or pins secured to the frame and provided with inclined faces. When the shutter has been set, the projections engage behind the lugs, and on releasing the blades they first move so as to open the lens-aperture, owing to the moving pivot-point being held back by the projections, and then close again when said projections slide off the lugs. The shutter has the same advantage as some other well-known shutters—namely, that in setting no exposure or uncovering of the lens takes place; but its special advantages are its simplicity, reliability, and its small thickness, so that even in cases where double lenses are used, with lenses very close to each other, it can be conveniently arranged near the iris-diaphragm between the two lenses.

The invention also relates to the "time" mechanism and to arrangements whereby the shutter is operated.

The shutter forming the subject of this invention is similar in appearance to the well-known Bausch-Lomb shutters.

Figure 5:
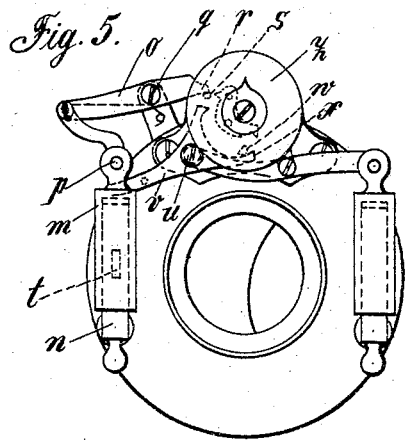
Figure 7:
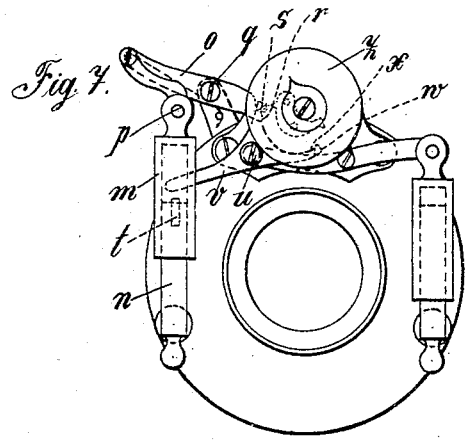
Figure 9:
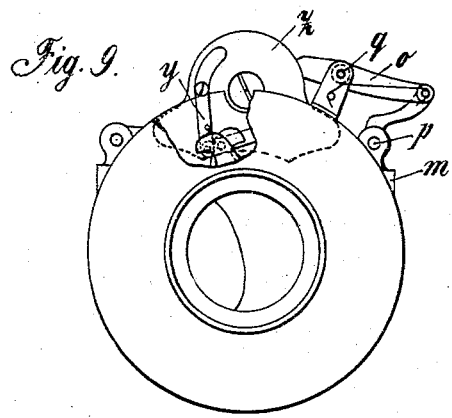
Figure 1:
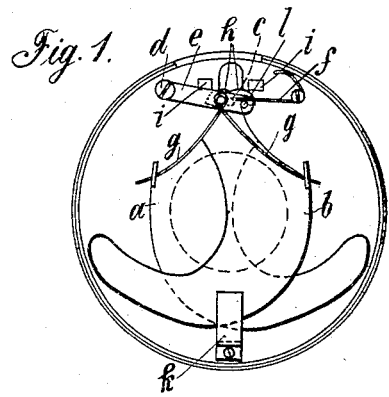
Figure 2:
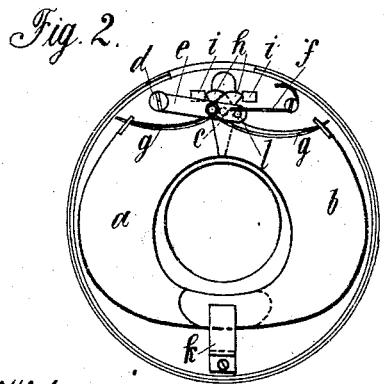
Figure 4:
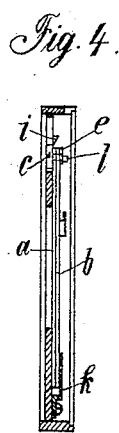
Figure 3:
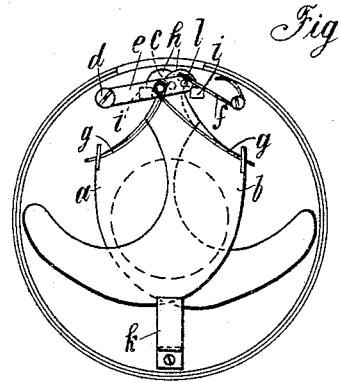
Figure 6:
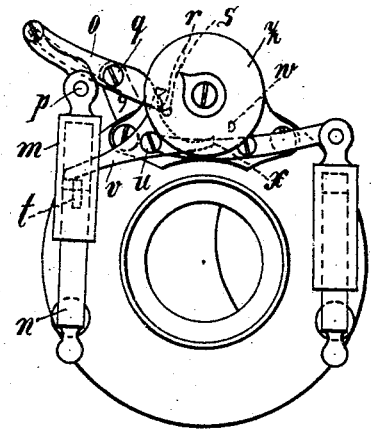
Figure 8:
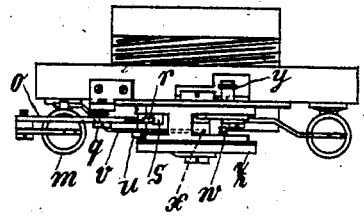
Figure 10:
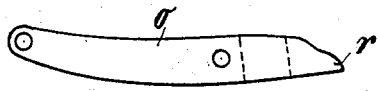
Figure 12:
Figure 11:

In the accompanying drawings, Figures 1, 2, and 3 are elevations showing back views of the shutter, without the setting and releasing device, in its normal position, in its open position, and when set, respectively. Fig. 4 is a central vertical section of Fig. 1. Fig. 5 is a front elevation of the complete shutter in its normal position. Fig. 6 is a similar view showing the shutter set for a time exposure. Fig. 7 shows the shutter thus set in its open position. Fig. 8 is a plan view relating to Fig. 6. Fig. 9 is a back view of the shutter, showing the connection between the setting-drum and the shutter-blades; and Figs. 10, 11, and 12 are detail views of the setting-lever, showing it in side elevation, plan, and end elevation, respectively.

In the construction shown in the drawings the blades $a\ b$ both pivot about a pin $c$, provided on a lever $e$, turning about a fulcrum $d$. The pivot-point of both blades or separate pivot-points of each blade could be arranged on a rectilinearly-guided slide instead of as illustrated. A spring $f$ is arranged which tends to press the lever $e$, together with its pivot pin or pins, downward. Another spring or springs, $g$, fixed at the outer edges to the two blades $a\ b$, tend to close the blades—that is to say, to cause them to swing inward. Near the pivot-point each of the blades is provided with a hook-shaped projection $h$. The casing is provided with lugs $i$, having inclined faces, Fig. 4. An angle-piece $k$ keeps the lower parts of blades together and guides them in their movements.

The normal position, Fig. 1, will be first considered. When the lever $e$, with the pivot $c$, is moved upward, the projections $h$ strike the inclined faces of the lugs $i$ and slide over them, the blades swinging outward in opposite directions. The lever $e$ being slightly springy yields in this motion. The projections $h$ then fall behind the lugs $i$, and the shutter is then in its set position, Fig. 3, and is held in that position by means to be described. When it is released, the projections $h$ are held back by the lugs $i$, the pivot $c$ descending, together with the lever $e$. This causes the blades to swing, and thus to uncover the lens-opening, Fig. 2. When the lever moves farther down, the projections $h$, which have become more overlapped, pass between the lugs $i$, eventually taking up their original positions, the spring $g$ simultaneously causing the blades to swing inward, the whole mechanism thus returning into its original position, Fig. 1.

The time regulating-disk $z$ is constructed as usual, and the setting of the shutter for instantaneous or time exposures is also effected in the well-known manner. As shown in the drawings, the apparatus is so arranged that two impulses are required to be given by means of the air-pressure bulb and cylinder of the usual pneumatic operating means, one impulse serving for setting and opening the shutter-blades *a b* and the second for releasing them.

The time-disk *z* is connected with the lever *e* at *l* by means of the link *y*.

The device for setting the drum is as follows: The cocking-lever *o* is connected by a link *p* with the cylinder *m*, which is movable on the piston *n*. The piston *n* is provided in the usual way with flexible tubing connecting it with an air-pressure bulb, so that the cocking-lever *o*, which is pivoted at *q*, can be raised by air-pressure. In order to enable the lever *o* to be also conveniently raised by hand, it is extended beyond the point of application. When the lever is raised by air-pressure or by hand, its projection *r* presses the pin *s* of the drum *z* and causes the drum to turn until stopped by the contact of the pin *w* with the releasing-lever *v*. Just before the end of the stroke a projection *t* on the cylinder *m* engages with the free end of the releasing-lever *v*, pivoted at *u*, so that the pin *w* of the drum is released. After the release of the pin *w* the cocking-lever *o*, which is pressed still higher, continues to turn the drum until the projection *r* slides away from the pin *s*, Fig. 6. The stroke has now been completed, so that the cylinder *n*, with the projection *t* and cocking-lever *o*, falls back again and the end *x* of the releasing-lever *v* rises again. As soon as the projection *r* has moved away from the pin *s* the time-disk *z* swings back until the pin *w* comes in front of the projection *x* of the releasing-lever *v*, Fig. 7, and the disk *z* is now locked and the apparatus secured in the open position. When the cylinder *m*, and therefore the releasing-lever *v*, is again raised to a small extent, the pin *w* is once more released, so that the drum *z* swings back to its original position. As the pin *s* is no longer in front of the projection *r*, the cocking and the releasing mechanisms can again return to their original positions. During the return of the cocking-lever *o* its projection *r* strikes the pin *s* and owing to the taper of the said projection (shown in Figs. 11 and 12) and to its being mounted in an elastic manner on the lever *o* is removed by the said pin from the plane of the lever, so that its taper surface passes in front of the pin. After the projection *r* has passed beyond the pin *s* it swings back again into the plane of the lever *o* and comes to lie over the pin *s*, as shown in Fig. 5.

What I claim as my invention, and desire to secure by Letters Patent, is—

1. In a photographic shutter the combination with the casing, of a shutter comprising two pivoted blades adapted to travel toward and away from each other, and projections arranged upon the blades the said blades being mounted on a movable pivot, in combination with lugs, on the casing, whereby during the setting of the shutter the projections slide and become engaged by the lugs, and on the release of the shutter first remain held while the blades move to uncover the lens, and then slip off the lugs and allow all the parts to return to their original positions substantially as described.

2. In a photographic shutter the combination with the casing, of a shutter comprising a pair of pivoted blades, a movable lever on which said blades are pivoted, projections on the pivot ends of said blades, fixed lugs on the casing adapted to engage said projections, springs for driving the blades across the casing, and a spring for acting upon the movable lever, substantially as described.

3. In a photographic shutter of the kind described, a pair of pivoted blades provided with outwardly-extending hook ends, substantially as and for the purpose described.

4. In combination with a photographic shutter of the kind described, a "cocking-lever," a pneumatic cylinder connected thereto whereby the said "cocking-lever" is operated, a "time" regulating-disk which is adapted to be rotated partially by said "cocking-lever," and a projection upon the pneumatic cylinder which during the last stage of the movement of the said cylinder engages with a releasing-lever thereby releasing the "time" regulating-disk, substantially as described.

5. In a photographic shutter the combination with the casing, of a shutter comprising a pair of blades, a movable lever, a pivot-pin carried by said lever and upon which the blades are pivoted, projections on the pivot ends of said blades, inclined fixed lugs on the casing adapted to engage said projections, springs for driving the blades across the casing and a spring for acting upon the movable lever; substantially as described.

In testimony whereof I have signed my name to this specification in the presence of two subscribing witnesses.

MAX ADALBERT RICHTER.

Witnesses:
    KARL GREIERT,
    OTTO WOLF.